United States Patent
Fredrickson et al.

(10) Patent No.: US 11,260,803 B2
(45) Date of Patent: Mar. 1, 2022

(54) AUDIO SYSTEM FOR A UTILITY VEHICLE

(71) Applicant: Polaris Industries Inc., Medina, MN (US)

(72) Inventors: Donovan L. Fredrickson, Independence, MN (US); Jonathan M. Hetland, Little Canada, MN (US); Keith A. Hollman, Osceola, WI (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 16/522,957

(22) Filed: Jul. 26, 2019

(65) Prior Publication Data
US 2021/0024007 A1    Jan. 28, 2021

(51) Int. Cl.
| | | |
|---|---|---|
| *B62D 33/06* | (2006.01) | |
| *B60K 5/00* | (2006.01) | |
| *B60K 15/04* | (2006.01) | |
| *B60K 1/04* | (2019.01) | |
| *B60K 13/02* | (2006.01) | |
| *B60R 7/06* | (2006.01) | |

(Continued)

(52) U.S. Cl.
CPC .......... *B60R 11/0217* (2013.01); *B62D 21/02* (2013.01); *B62D 25/14* (2013.01); *B62D 63/04* (2013.01); *H04R 1/025* (2013.01); *B60R 2011/0003* (2013.01); *B60R 2011/0005* (2013.01); *B60R 2011/0043* (2013.01); *H04R 2499/13* (2013.01)

(58) Field of Classification Search
CPC ......... B60R 11/0217; B60R 2011/0003; B60R 2011/0005; B60R 2011/0043; B62D 21/02; B62D 25/14; B62D 63/04; H04R 1/025; H04R 2499/13
USPC .......................................................... 381/86
See application file for complete search history.

(56) References Cited

U.S. PATENT DOCUMENTS

| | | | |
|---|---|---|---|
| 3,007,726 | A | 11/1961 | Parkin |
| 3,600,768 | A | 8/1971 | Romanzi |

(Continued)

FOREIGN PATENT DOCUMENTS

| | | |
|---|---|---|
| CN | 1646359 | 7/2005 |
| CN | 201007087 | 1/2008 |

(Continued)

OTHER PUBLICATIONS

MTX (MTX Audio Thunder Sports rzrpod65-owners-manual, 2016) (Year: 2016).*

(Continued)

*Primary Examiner* — Vivian C Chin
*Assistant Examiner* — Douglas J Suthers
(74) *Attorney, Agent, or Firm* — Faegre Drinker Biddle & Reath LLP

(57) ABSTRACT

An all-terrain or utility vehicle includes an audio system having at least one speaker. The at least one speaker is positioned at a forward portion of the operator area and is supported by a body panel. More particularly, the body panel may be configured to receive at least a portion of the speaker as well as at least a portion of an upper frame assembly. In this way, the speaker is positioned to direct sound towards the rider, is generally concealed from a front view of the vehicle, and is positioned within available space on the vehicle above at least a portion of the door.

28 Claims, 13 Drawing Sheets

(51) Int. Cl.
    *B62D 25/20*     (2006.01)
    *B62D 25/14*     (2006.01)
    *B60R 11/02*     (2006.01)
    *H04R 1/02*     (2006.01)
    *B62D 21/02*     (2006.01)
    *B62D 63/04*     (2006.01)
    *B60R 11/00*     (2006.01)

(56) References Cited

U.S. PATENT DOCUMENTS

| | | | |
|---|---|---|---|
| 4,429,588 A | 2/1984 | Emundts | |
| 5,083,827 A | 1/1992 | Hollenbaugh, Sr. | |
| 5,167,433 A | 12/1992 | Ryan | |
| 5,201,562 A | 4/1993 | Dorsey | |
| 5,306,044 A | 4/1994 | Tucker | |
| 6,086,158 A | 7/2000 | Zeoli | |
| 6,293,588 B1 | 9/2001 | Clune | |
| 6,309,024 B1 | 10/2001 | Busch | |
| 6,328,364 B1 | 12/2001 | Darbishire | |
| 6,502,886 B1 | 1/2003 | Bleau | |
| 6,644,709 B2 | 11/2003 | Inagaki | |
| 6,682,118 B2 | 1/2004 | Ryan | |
| 6,733,060 B1 | 5/2004 | Pavkov | |
| 6,880,875 B2 | 4/2005 | McClure | |
| 6,883,851 B2 | 4/2005 | McClure | |
| 7,118,151 B2 | 10/2006 | Bejin | |
| 7,156,439 B2 | 1/2007 | Bejin | |
| 7,503,610 B2 | 3/2009 | Karagitz | |
| 7,625,048 B2 | 12/2009 | Rouhana | |
| 7,819,220 B2 | 10/2010 | Sunsdahl | |
| 7,832,770 B2 | 11/2010 | Bradley | |
| 7,954,679 B2 | 6/2011 | Edwards | |
| 8,104,524 B2 | 1/2012 | Manesh | |
| 8,176,957 B2 | 5/2012 | Manesh | |
| 8,215,694 B2 | 7/2012 | Smith | |
| 8,231,164 B2 | 7/2012 | Schubring | |
| 8,328,235 B2 | 12/2012 | Schneider | |
| 8,464,824 B1 | 6/2013 | Reisenberger | |
| 8,465,050 B1 | 6/2013 | Spindler | |
| 8,548,710 B1 | 10/2013 | Reisenberger | |
| 8,613,335 B2 | 12/2013 | Deckard | |
| 8,640,814 B2 | 2/2014 | Deckard | |
| 8,781,705 B1 | 7/2014 | Reisenberger | |
| 8,827,025 B2 | 9/2014 | Hapka | |
| 8,827,028 B2 | 9/2014 | Sunsdahl | |
| 8,997,908 B2 | 4/2015 | Kinsman | |
| 9,573,561 B2 | 2/2017 | Muto | |
| 9,776,481 B2 | 10/2017 | Deckard | |
| 10,112,555 B2 | 10/2018 | Aguilera | |
| 10,154,377 B2 | 12/2018 | Post | |
| 2001/0041126 A1 | 11/2001 | Morin | |
| 2002/0135175 A1 | 9/2002 | Schroth | |
| 2003/0015531 A1 | 1/2003 | Choi | |
| 2003/0057724 A1 | 3/2003 | Inagaki | |
| 2005/0073187 A1 | 4/2005 | Frank | |
| 2005/0248173 A1 | 11/2005 | Bejin | |
| 2006/0017301 A1 | 1/2006 | Edwards | |
| 2006/0181104 A1 | 8/2006 | Khan | |
| 2006/0255610 A1 | 11/2006 | Bejin | |
| 2008/0106115 A1 | 5/2008 | Hughes | |
| 2008/0296884 A1 | 12/2008 | Rouhana | |
| 2009/0184531 A1* | 7/2009 | Yamamura | B62D 33/02 296/37.6 |
| 2010/0090797 A1 | 4/2010 | Koenig | |
| 2010/0314191 A1 | 12/2010 | Deckard | |
| 2011/0297462 A1 | 12/2011 | Grajkowski | |
| 2011/0309118 A1 | 12/2011 | Wada | |
| 2012/0223500 A1 | 9/2012 | Kinsman | |
| 2013/0033070 A1 | 2/2013 | Kinsman | |
| 2013/0199097 A1 | 8/2013 | Spindler | |
| 2014/0103627 A1 | 4/2014 | Deckard | |
| 2014/0294195 A1 | 10/2014 | Perez | |
| 2016/0332553 A1 | 11/2016 | Miller | |
| 2017/0013336 A1 | 1/2017 | Stys | |
| 2017/0334500 A1 | 11/2017 | Jarek | |
| 2018/0065465 A1 | 3/2018 | Ward | |
| 2019/0110161 A1 | 4/2019 | Rentz | |
| 2019/0193501 A1 | 6/2019 | Brady | |
| 2019/0210668 A1 | 7/2019 | Endrizzi | |
| 2019/0256010 A1* | 8/2019 | Baba | B60R 11/02 |
| 2019/0265064 A1 | 8/2019 | Koenig | |
| 2019/0306599 A1 | 10/2019 | Nagai | |

FOREIGN PATENT DOCUMENTS

| | | |
|---|---|---|
| CN | 104661903 | 5/2015 |
| CN | 107635800 | 1/2018 |
| DE | 2752798 | 6/1978 |
| DE | 3007726 | 9/1981 |
| EP | 0697306 | 2/1996 |
| FR | 2907410 | 4/2008 |
| JP | 53101625 | 9/1978 |
| WO | 2003/70543 | 8/2003 |
| WO | 2014/047488 | 3/2014 |
| WO | 2014/059258 | 4/2014 |
| WO | WO 2019/140026 | 1/2019 |

OTHER PUBLICATIONS

Patent Examination Report issued by the Australian Government IP Australia, dated Apr. 7, 2016, for Australian Patent Application No. 2013329090; 3 pages.
International Search Report and Written Opinion issued by the European Patent Office, dated Jan. 14, 2014, for International Patent Application No. PCT/US2013/064516; 23 pages.
International Preliminary Report on Patentability issued by The International Bureau of WIPO, dated Apr. 14, 2015, for International Patent Application No. PCT/US2013/064516; 18 pages.
International Preliminary Report on Patentability issued by The International Bureau of WIPO, dated Jul. 14, 2020, for International Patent Application No. PCT/US2019/012958; 19 pages.
International Search Report and Written Opinion issued by the European Patent Office, dated Jul. 3, 2019, for International Patent Application No. PCT/US2019/012958; 27 pages.
International Search Report and Written Opinion issued by the International Searching Authority, dated Oct. 21, 2020, for International Patent Application No. PCT/US2020/42787; 18 pages.
"Select Increments 2007-2018 Compatible With Jeep Wrangler JK and Unlimited With Infinity or Alpine Premium Factory Systems Pillar Pods with Kicker speakers PP0718-IA-K" (Select), Dec. 14, 2018; 6 pages.
International Preliminary Report on Patentability issued by the International Preliminary Examining Authority, dated Jun. 24, 2021, for International Patent Application No. PCT/US2020/042787; 19 pages.
Office Action issued by the Chinese Patent Office, dated Jun. 9, 2021, for Chinese Patent Application No. 201980007897.1; 5 pages.

* cited by examiner

AUDIO SYSTEM FOR A UTILITY VEHICLE

CROSS-REFERENCE TO RELATED APPLICATIONS

The present application is related to U.S. patent application Ser. No. 16/244,462, filed Jan. 10, 2019, and entitled "VEHICLE" and U.S. Provisional Patent Application Ser. No. 62/840,654, filed Apr. 30, 2019, and entitled "VEHICLE", the complete disclosures of which are expressly incorporated by reference herein.

FIELD OF THE DISCLOSURE

The present invention relates generally to an audio system for a vehicle and, in particular, to the location and mounting of speakers and audio components on all-terrain or utility vehicle.

BACKGROUND OF THE DISCLOSURE

Some vehicles such as utility vehicles, all-terrain vehicles, tractors, and others include infotainment options for the rider, which allow the rider to listen to music, use Bluetooth connectivity for cellular devices, engage in intervehicle communications, review and select operating conditions for the vehicle, etc. To allow for these options, such vehicles include an audio systems with at least one speaker.

However, there can be challenges to finding available space in the vehicle cabin for speakers. As such, it is known that speakers may be positioned near various body panels or other surfaces that can negatively impact or divert the sound away from the rider. For example, the speaker(s) may be positioned in the door or kick panel of a vehicle such that the speaker(s) does not focus or direct sound toward the rider's ears/head. Further, aesthetically, it may be desirable to allow the speaker and/or other components of the audio system to blend in with various body panels or frame members of the vehicle. As such, there is a need for an audio system for an all-terrain or utility vehicle which provides appropriate sound quality to the rider and utilizes available space on the vehicle.

SUMMARY OF THE DISCLOSURE

In one embodiment of the present disclosure, a utility vehicle comprises a frame assembly having an upper frame assembly and a lower frame assembly coupled to each other at a coupling location; a body assembly supported by the frame assembly and including a dashboard assembly; and an open-air operator area positioned generally below an upper extent of the upper frame assembly and rearward of the coupling location. The utility vehicle also comprises an audio system configured to project sound within the operator area. The audio system includes at least one speaker positioned above the dashboard assembly.

In another embodiment of the present disclosure, a utility vehicle comprises a frame assembly having an upper frame assembly and a lower frame assembly coupled to each other at a coupling location; a body assembly including at least a hood and a door and supported by the frame assembly; and an operator area positioned generally below an upper extent of the upper frame assembly and rearward of the coupling location. The utility vehicle also comprises an audio system configured to project sound within the operator area. The audio system includes at least one speaker positioned above a portion of the door.

In a further embodiment of the present disclosure, a utility vehicle comprises a frame assembly including a lower frame assembly and an upper frame assembly. The upper frame assembly is coupled to the lower frame assembly at a first connection location. The utility vehicle also comprises a body assembly supported by the frame assembly and comprising a plurality of body panels. Additionally, the utility vehicle comprises an operator area defined by the upper and lower frame assemblies which includes seating configured to support at least an operator of the utility vehicle. The utility vehicle also comprises an audio system configured to project sound within the operator area. At least one of the plurality of body panels is configured to support a portion of the audio system and a portion of the frame assembly. The at least one of the plurality of body panels is further configured to conceal the first connection location.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to any vehicle with one or more ground-engaging members and a continuously variable transmission, including, but not limited to, all-terrain vehicles, motorcycles, snowmobiles, scooters, three-wheeled vehicles, and golf carts.

Referring to FIGS. 1-7, an illustrative embodiment of a utility vehicle 2 is shown. Vehicle 2 is configured for off-road operation. Vehicle 2 includes a plurality of ground-engaging members 4, illustratively front wheels 6 and rear wheels 8. In one embodiment, one or more of ground-engaging members 4 may be replaced with tracks, such as the Prospector II Tracks available from Polaris Industries, Inc., located at 2100 Highway 55 in Medina, Minn. 55340 or non-pneumatic tires, such as those shown in U.S. Pat. Nos. 8,176,957 and 8,104,524, the complete disclosures of which are expressly incorporated herein by reference.

Figure 1:
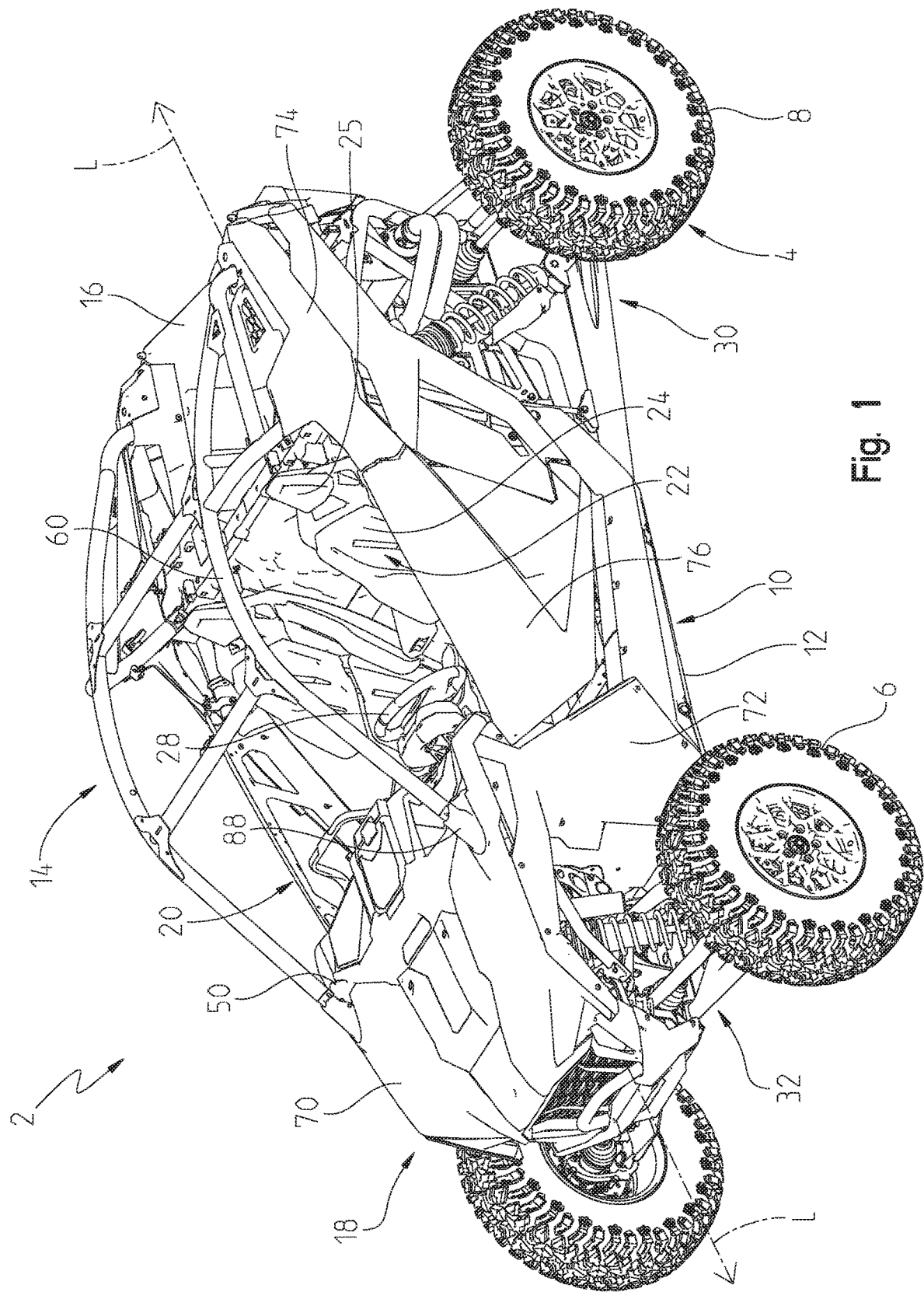
FIG. 1 is a front left perspective view of a utility vehicle of the present disclosure.
Figure 2:
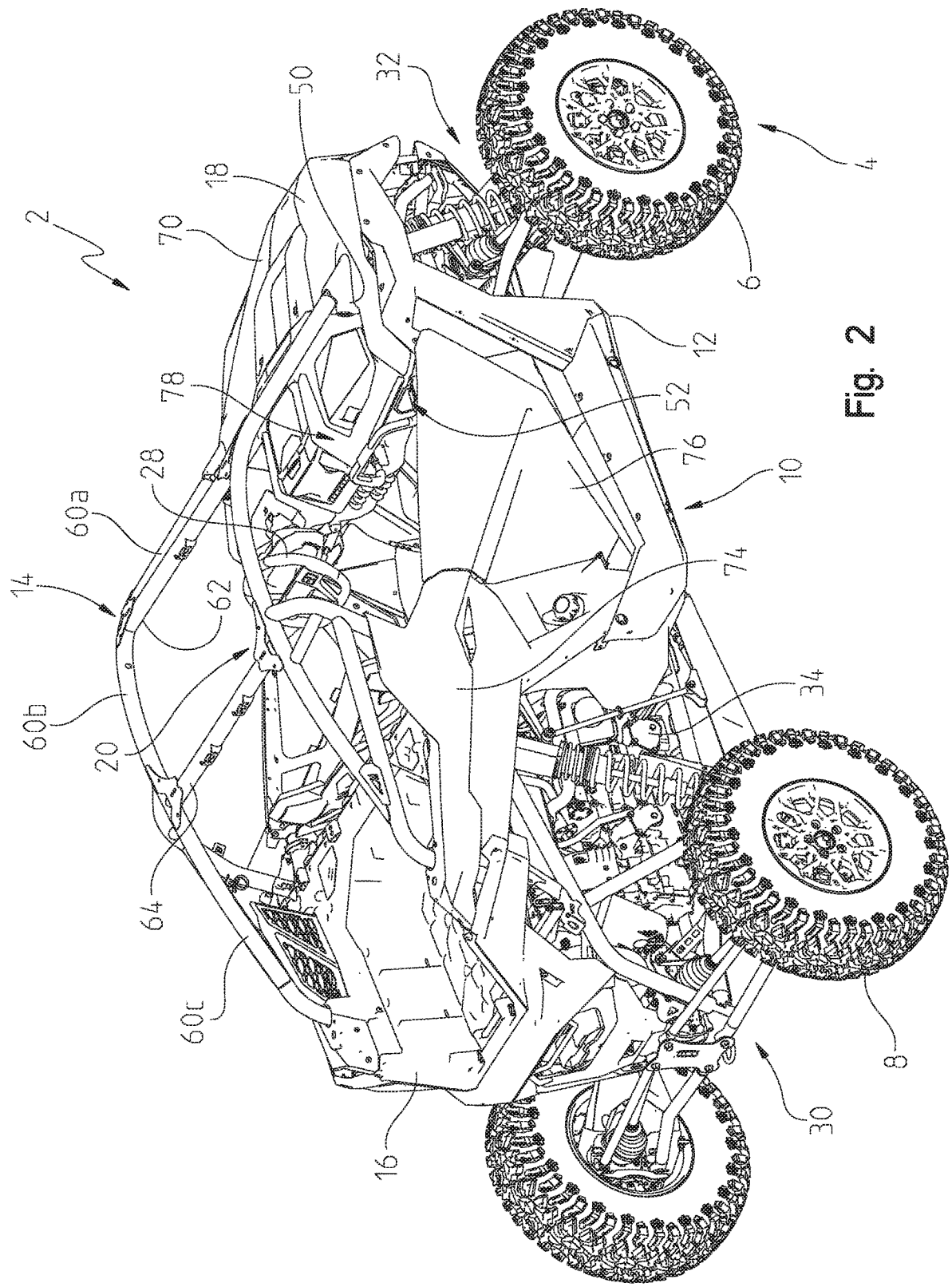
FIG. 2 is a rear right perspective view of the vehicle of FIG. 1.

Vehicle 2 further includes a frame assembly 10 supported by ground-engaging members 4, which extends along a longitudinal axis L of vehicle 2 (FIG. 1). Additionally, in one embodiment, frame assembly 10 may include a lower frame assembly 12 and an upper frame assembly 14 extending vertically above lower frame assembly 12; however, alternative embodiments of vehicle 2 may not include upper frame assembly 14. At least lower frame assembly 12 supports a rear cargo area 16 and a vehicle body 18, which includes a plurality of body panels.

In one embodiment, upper frame assembly 14 includes a plurality of frame members removably or permanently coupled together. As used herein, "coupled," "couples," "coupling," or any variation thereof defines a permanent joining (e.g., welding) or a temporary or removable joining (e.g., bolts, nuts, screws, etc.). As shown in FIGS. 1-7, upper frame assembly 14 includes longitudinally-extending members 60 configured to extend from a front portion of vehicle 2 adjacent an operator area 20 to a rear portion of vehicle 2 adjacent rear cargo area 16. Longitudinally-extending members 60 including a forward portion 60a positioned generally forward of seating 22 in operator area 20, an intermediate portion 60b positioned generally above seating 22, and a rearward portion 60c positioned generally rearward of seating 22. Additionally, upper frame assembly 14 includes at least one cross-member and, illustratively includes a forward cross-member 62 and a rearward cross-member 64, each of which are coupled to longitudinally-extending members 60.

Referring still to FIGS. 1-7, vehicle body 18 includes various body panels supported along longitudinal axis L of vehicle 2. More particularly, vehicle body 18 includes a hood assembly 70, front side panels or fenders 72, rear side panels or fenders 74, doors 76, and a dashboard assembly 78. As shown best in FIGS. 9 and 10, dashboard assembly 78 may include an upper dash portion 80 and a lower dash portion 82. Upper and lower dash portions 80, 82 may be removably or permanently coupled to each other and are configured to support various components of vehicle 2, such as a gauge or display 84, a plurality of inputs 86, a steering wheel 28, and others. Various operator inputs or controls may be further described in U.S. patent application Ser. No. 16/244,462, filed Jan. 10, 2019, and entitled "VEHICLE" and U.S. Provisional Patent Application Ser. No. 62/840,654, filed Apr. 30, 2019, and entitled "VEHICLE", the complete disclosures of which are expressly incorporated by reference herein.

Vehicle 2 also includes an open-air operator area 20 which, illustratively, includes seating 22 for one or more passengers. As such, operator area 20 is exposed to ambient air and may not be fully enclosed. Alternatively, vehicle 2 may include a cab assembly (not shown), such as a roof, front windshield, rear windshield, doors, or any combination thereof to enclose operator area 20. Upper frame assembly 14 may be positioned generally around operator area 20 such that seating 22 is at least partially surrounded by upper frame assembly 14. Illustratively, seating 22 includes an operator seat and a passenger seat, however, seating 22 may also include rear seats for additional passengers or may include only a single seat for carrying the operator. Seating 22 may include a seat back 24 having a head rest 25 (FIG. 1) and a seat bottom 26.

Referring still to FIGS. 1-7, vehicle 2 includes a rear suspension assembly 30 and a front suspension assembly 32, both supported by lower frame assembly 12. Additional details of rear and front suspension assemblies 30, 32 may be disclosed in U.S. patent application Ser. No. 16/226,797, filed Dec. 20, 2018, and entitled "REAR SUSPENSION ASSEMBLY FOR A VEHICLE", the complete disclosure of which is expressly incorporated by reference herein.

Referring to Fig, vehicle 2 further includes a powertrain assembly 34 which is supported by lower frame assembly 12 and includes at least a prime mover, illustratively an engine 36, a geartrain which may be configured as a shiftable transmission (not explicitly shown), and a continuously variable transmission ("CVT") 38. Engine 36 is positioned rearward of operator area 20. While the prime mover is disclosed as engine 36, the prime mover may be any type of device configured to provide power to vehicle 2, such as an electric motor, a fuel-based engine, a hybrid engine, a generator, etc. In one embodiment, CVT 38 also is positioned at least partially rearward of operator area 20. CVT 38 may be positioned laterally outward from or to the side of engine 36 in a direction generally perpendicular to a longitudinal axis L of vehicle 2 (FIG. 1) to extend generally parallel to longitudinal axis L. However, CVT 38 also may extend in a generally perpendicular direction relative to longitudinal axis L or may be configured in any orientation relative to longitudinal axis L, engine 36, and the geartrain. For example, in one embodiment, CVT 38 may be positioned longitudinally forward of engine 36 and configured to extend laterally in a direction generally perpendicular to longitudinal axis L.

Figure 8:
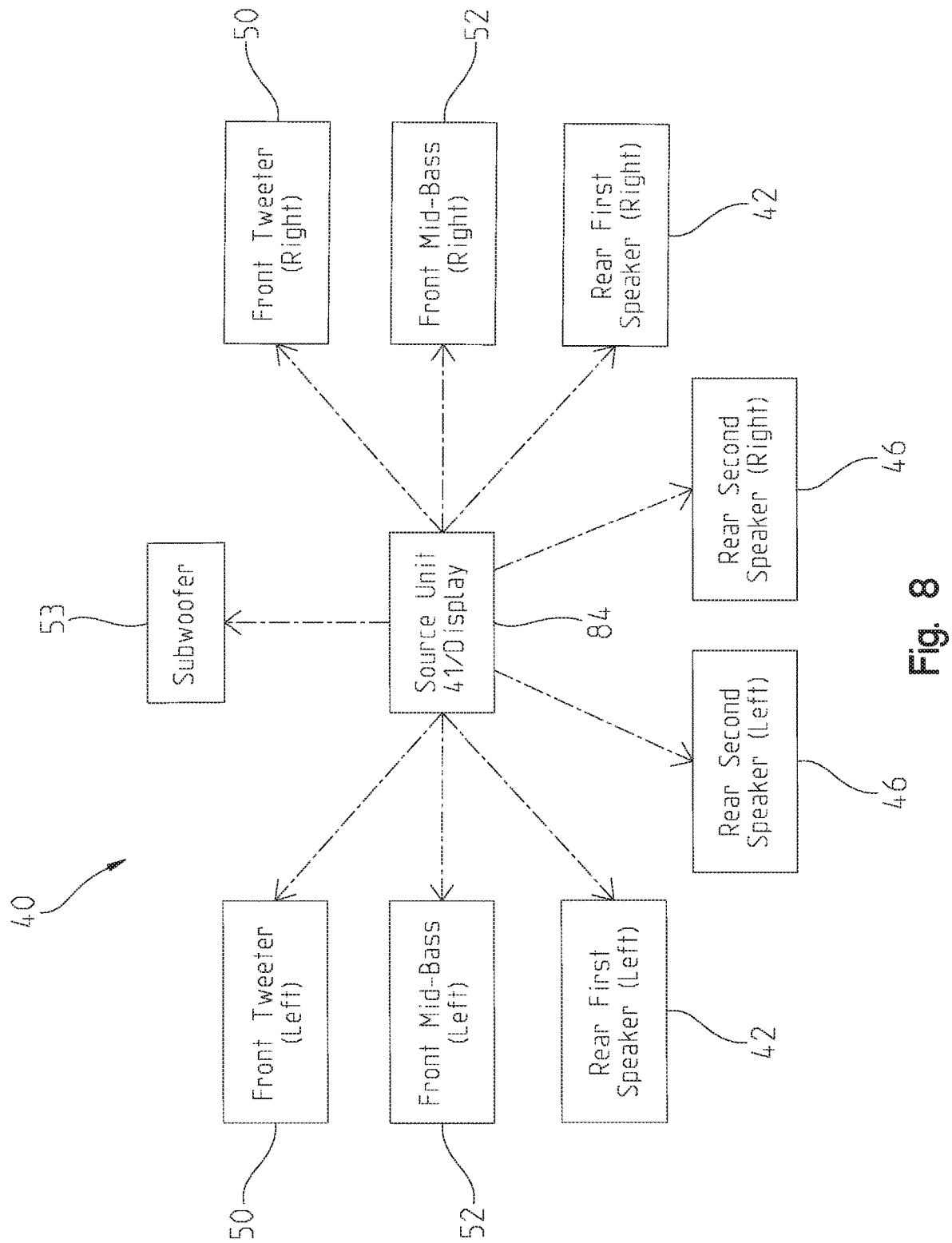
FIG. 8 is a diagrammatic view of an audio system of the vehicle of FIG. 1.

Referring to FIGS. 8-14, vehicle 2 further includes an audio system or assembly 40 configured to project sound into and within operator area 20. In various embodiments, audio system 40 is configured to project music, phone calls or other commands from a cellular phone (e.g., via Bluetooth connectivity), communications between connected vehicles, commands or operating conditions of vehicle 2 (e.g., via connectivity with display 84), etc. into operator area 20 and towards at least the operator. As shown in FIG. 8, audio system 40 includes at least one speaker and, illustratively, includes first rear speakers 42, second rear speakers 46, front speaker sets comprising front tweeters 50 and front mid-bass speakers 52, and a speaker woofer or subwoofer 53. Audio system 40 is configured to receive an input from a source unit 41 (e.g., a music command, a Bluetooth command, a cellular command, a wired command via USB, etc.) to output sound. Source unit 41 is in communication or integrated with display 84 such that the operator or passenger can selectively input a command to initiate the sound output. Once audio system 40 is engaged, at least one signal is transmitted to output sound through any or all of speakers 42, 46, 50, 52 and/or subwoofer(s) 53. It may be appreciated that various embodiments of audio system 40 may not include all of speakers 42, 46, 50, 52 and/or subwoofer 53. Additional details of audio system 40, display 84, source unit 41, and/or operation of Bluetooth commands, intervehicle communications, cellular commands and integration, and others may be disclosed in U.S. patent application Ser. No. 16/234,1692, filed Dec. 27, 2018, and entitled "RECREATIONAL VEHICLE INTERACTIVE TELEMETRY, MAPPING, AND TRIP PLANNING"; U.S. Pat. No. 10,154,377, filed Sep. 12, 2016, and entitled "VEHICLE TO VEHICLE COMMUNICATIONS DEVICE AND METHODS FROM RECREATIONAL VEHICLES"; U.S. patent application Ser. No. 15/161,720, filed May 23, 2016, and entitled "DISPLAY SYSTEMS AND METHODS FOR A RECREATIONAL VEHICLE"; U.S. patent application Ser. No. 16/043,514, filed Jul. 24, 2018, and entitled "RECREATIONAL VEHICLE GROUP MANAGEMENT SYSTEMS"; and U.S. Provisional Patent Application Ser. No. 62/783,601, filed Dec. 21, 2018, and entitled "SYSTEMS AND METHODS FOR CONNECTING ACCESSORIES TO RECREATIONAL VEHICLES", the complete disclosures of which are expressly incorporated by reference herein.

Figure 9:
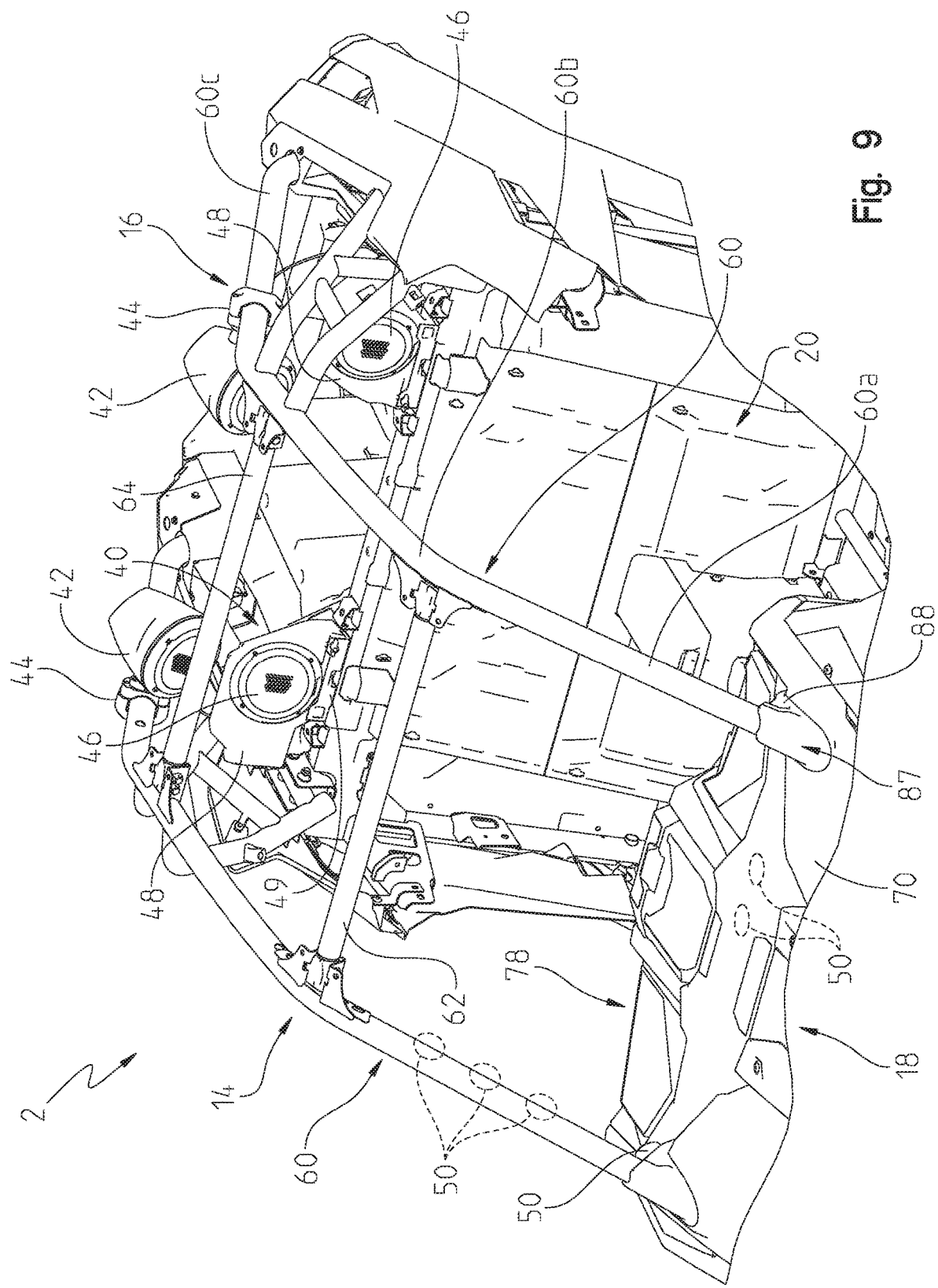
FIG. 9 is a front left perspective view of an operator area of the vehicle of FIG. 1 including the audio system of FIG. 8 having at least one speaker positioned generally rearward of an operator.

Referring to FIG. 9, first and second rear speakers 42, 46 are generally positioned rearwardly of operator area 20 and rearwardly of the operator's and/or passenger's head. In one embodiment, at least second rear speakers 46 are defined as coaxial speakers. First rear speakers 42 are supported by a portion of upper frame assembly 14 and, specifically, may be supported on longitudinally-extending members 60. Illustratively, first rear speakers 42 are removably coupled to rearward portion 60c of longitudinally-extending members 60 with clamps or couplers 44. Clamps 44 may hingedly enclose a portion of rearward portion 60c of longitudinally-extending members 60 to allow easy attachment and removal of first rear speakers 42 to vehicle 2. When attached to longitudinally-extending members 60, first rear speakers 42 may be positioned above a forward portion of rear cargo area 16 and adjacent second rear speakers 46 and head rests 25.

Referring still to FIG. 9, second rear speakers 46 are illustratively positioned below a portion first rear speakers 42 and are supported by lower frame assembly 12, upper frame assembly 14, and/or rear cargo area 16. In one embodiment, second rear speakers 46 are integrated into a body panel or other portion of rear cargo area 16. In one embodiment, second rear speakers 46 include a mounting plate 48 which removably couple to a bracket or mount 49 on frame assembly 10.

As shown in FIG. 9, first and second rear speakers 42, 46 may be positioned on both the right and left sides of vehicle 2 and are directed towards operator area 20. It may be apparent that first and second rear speakers 42, 46 are positioned generally adjacent and/or above head rest 25 (FIG. 1) of seating 22 and above at least a portion of doors 76. In this way, speakers 42, 46 face the operator and are configured to direct sound towards the head of the operator and/or the passenger to improve the sound quality heard by the operator and/or passenger. Additionally, the projection of the sound from speakers 42, 46 is not impeded or redirected by any panels or other components of vehicle 2, thereby, again, allowing enhanced sound quality to be heard within operator area 20. Because vehicle 2 may be an open-air vehicle with an open-air operator area 20, first and second rear speakers 42, 46 are positioned to direct sound at the operator's head without any hinderance to the sound.

Referring now to FIGS. 10-14, audio system 40 further includes front speaker sets, comprised of front tweeters 50 and front mid-bass speakers 52, and subwoofer 53. Subwoofer 53 may be positioned on lower dash portion 82 and, more particularly, may be positioned adjacent a storage compartment (e.g., a glove compartment) 83. Illustratively, subwoofer 53 are positioned below glove compartment 83. Subwoofer 53 faces rearwardly to direct sound towards the operator.

Figure 5:
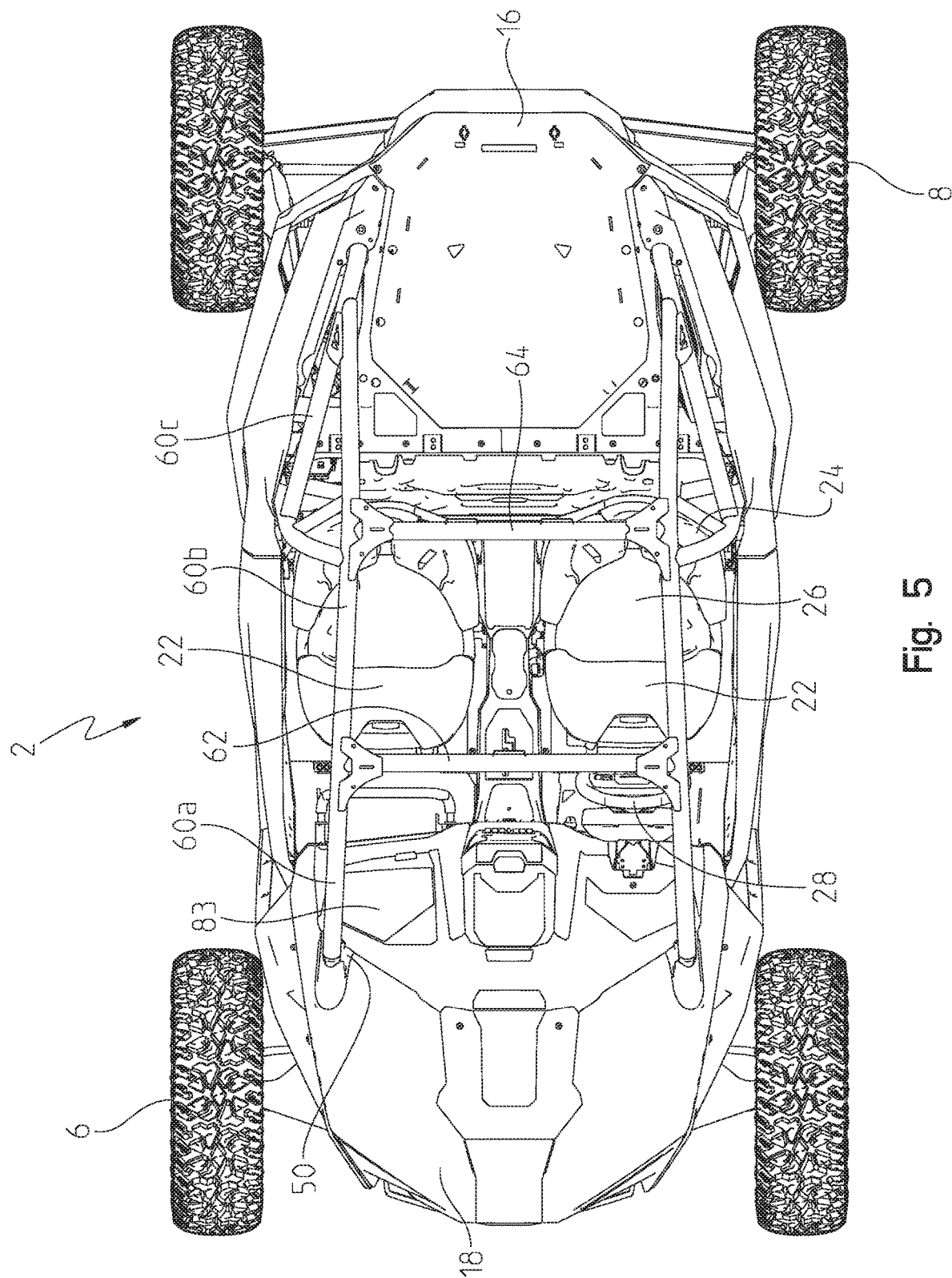
FIG. 5 is a top view of the vehicle of FIG. 1.
Figure 6:
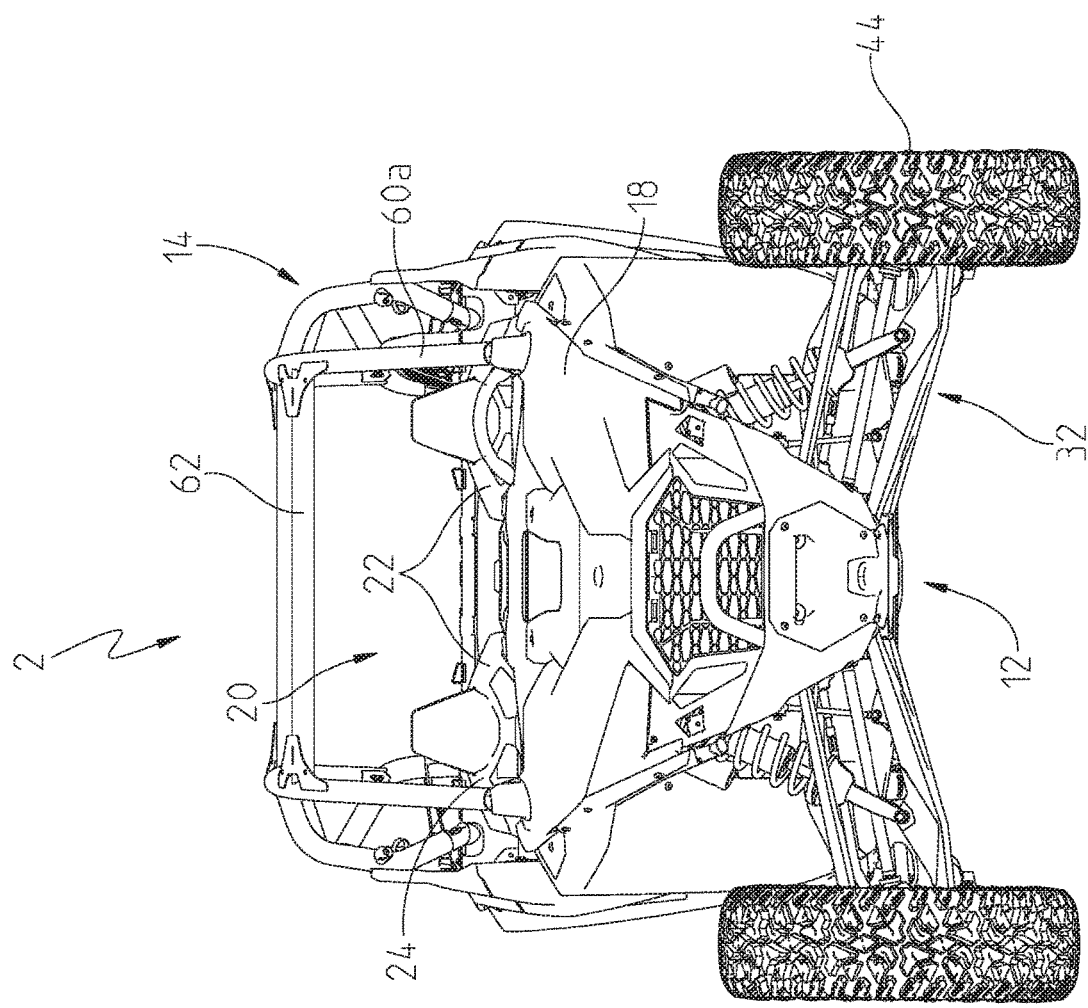
FIG. 6 is a front view of the vehicle of FIG. 1.
Figure 7:
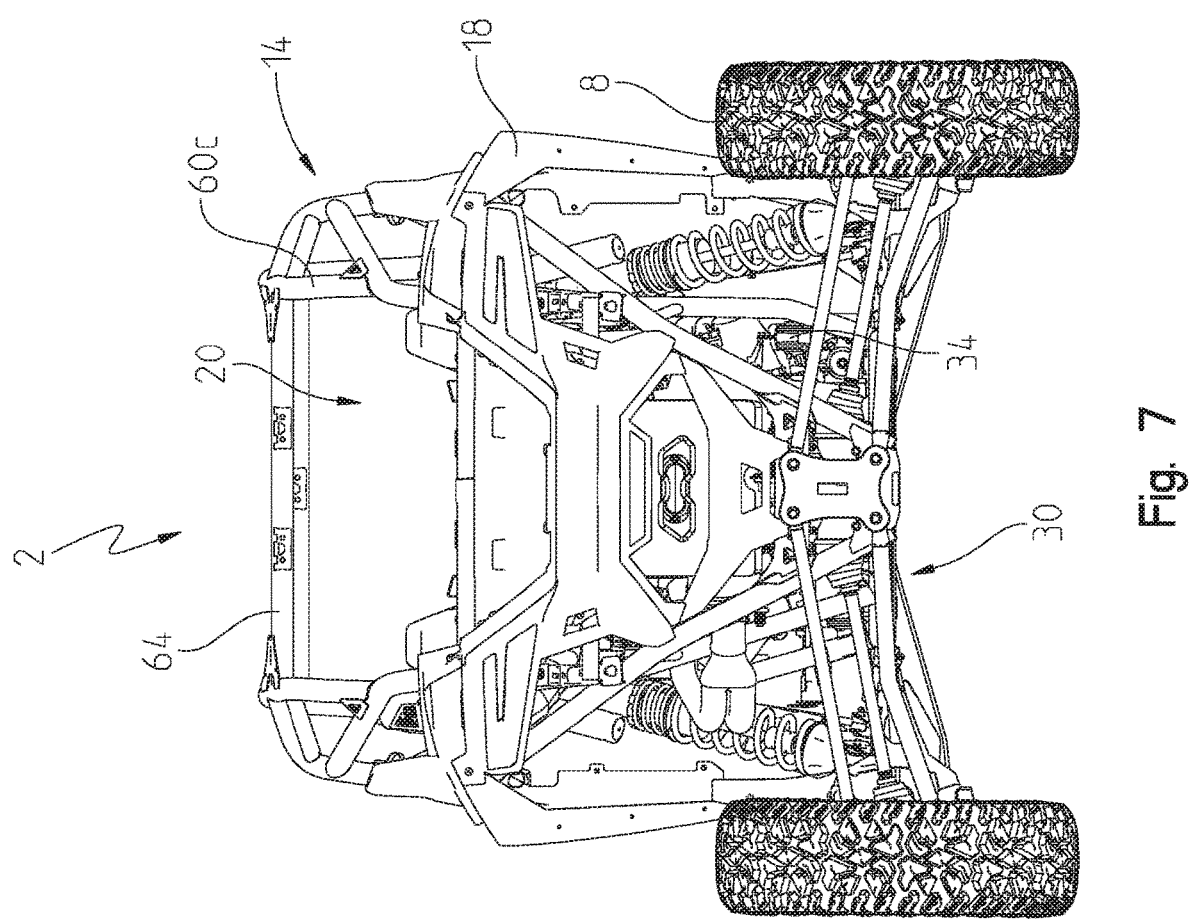
FIG. 7 is a rear view of the vehicle of FIG. 1.

Front speakers 50, 52 are positioned generally forward of seating 22 (FIG. 1) and are supported on or adjacent to dashboard assembly 78. More particularly, speakers 52 are positioned within lower dash portion 82 and face in a rearward direction towards seating 22. Speakers 52 are spaced apart from doors 76 such that any sound emanating from speakers 52 is not impeded or redirected by panels on doors 76. In one embodiment, speaker 52 along the left side of vehicle 2 is positioned generally adjacent a portion of steering wheel 28 (FIG. 1) and speaker 52 along the right side of vehicle 2 is positioned generally adjacent glove compartment 83 of dashboard assembly 78. In this way, speakers 52 are positioned away from door 76 and above the floor of vehicle 2 to better direct sound towards the operator and passenger. Further, at least a portion of speakers 52 is positioned at a vertical height greater than that of seat bottom 26 (FIG. 5).

Front tweeters 50 also area positioned away from door 76 and above the floor of vehicle 2. Additionally, front tweeters 50 are positioned at a vertical height greater than that of at least seat bottom 26 (FIG. 5). In this way, like speakers 52, front tweeters 50 also direct sound rearwardly into operator area 20 such that sound is not redirected off of a body panel or other component of vehicle 2. Therefore, front tweeters 50 and speakers 52 enhance the sound quality experienced by the operator and/or the front passenger.

With reference still to FIGS. 10-14, front tweeters 50 are positioned above a portion of dashboard assembly 78 and, specifically, above an upper extent of upper dash portion 80. Additionally, front tweeters 50 are positioned adjacent forward portion 60a of longitudinally-extending members 60 of upper frame assembly 14. Illustratively, tweeters 50 are positioned rearward of a coupling location 87 between forward portion 60a and lower frame assembly 12 and also are positioned above at least a portion of steering wheel 28. Further, tweeters 50 also are positioned above a majority of seating 22 and, more specifically, are positioned above seat bottom 26 and are generally aligned with head rest 25 of seat back 24.

Figure 10:
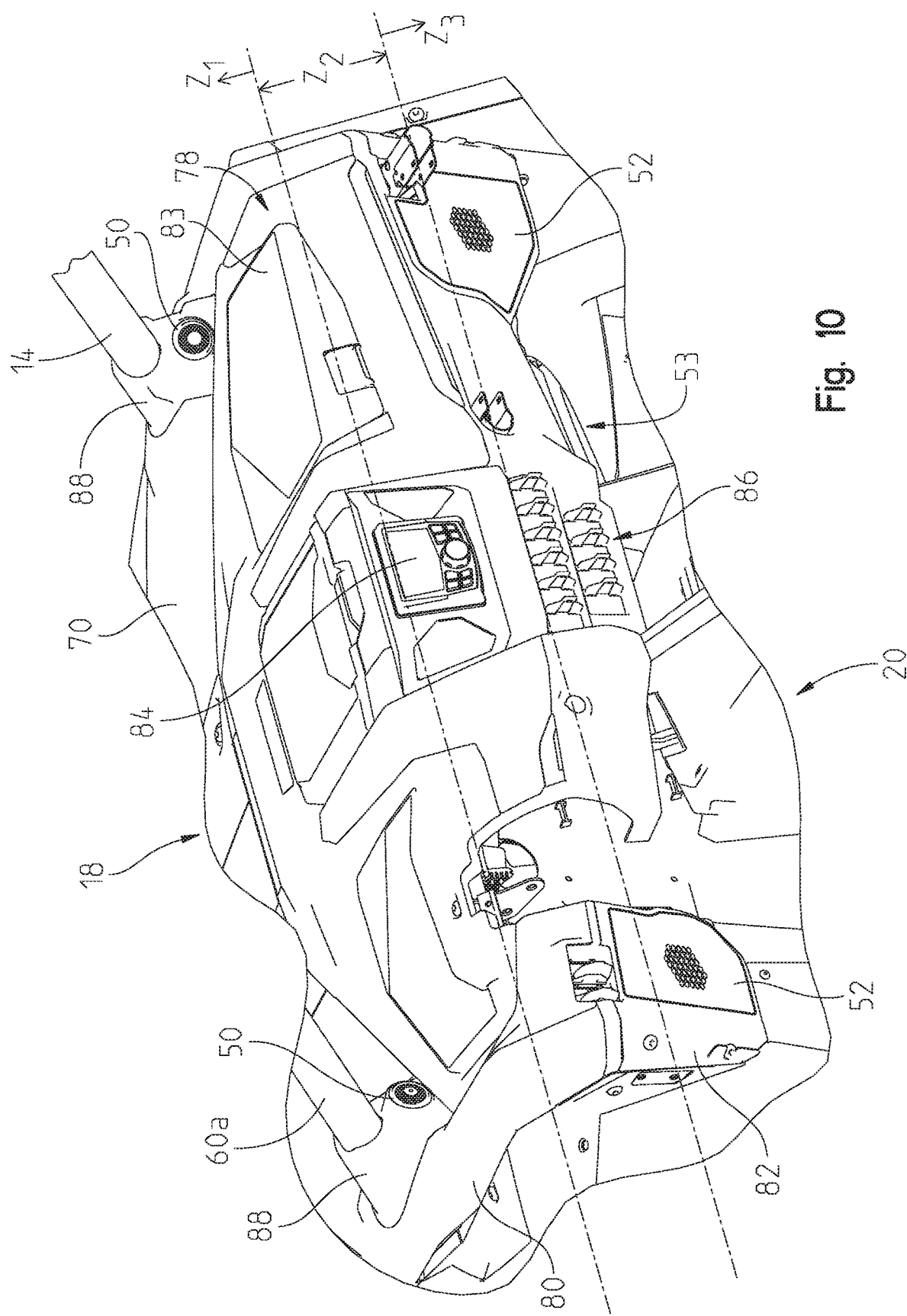
FIG. 10 is a rear left perspective view of the operator area of FIG. 9 which is configured to support additional components of the audio system of FIG. 8
Figure 11:
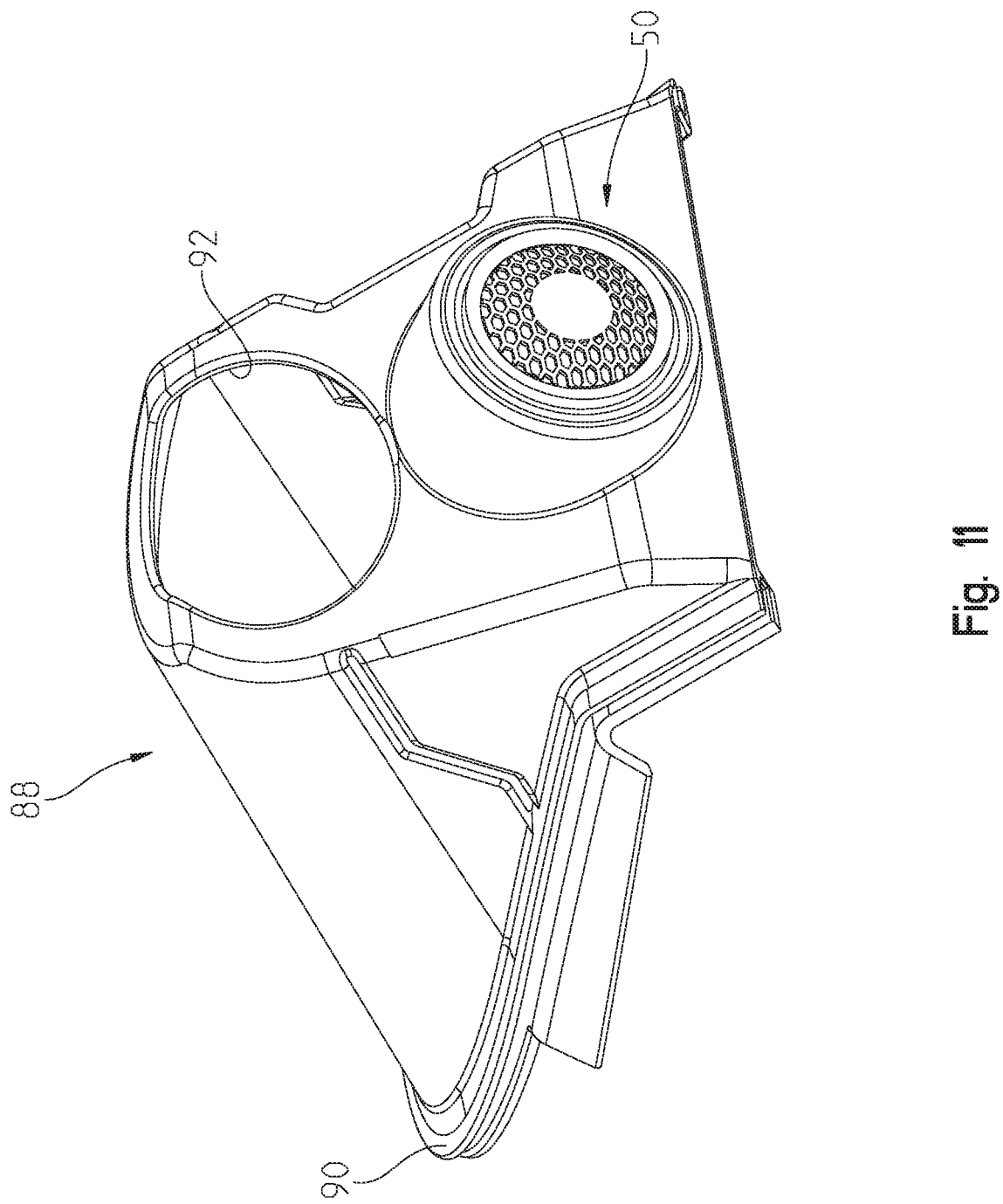
FIG. 11 is a rear left perspective view of a body panel or enclosure configured to support a speaker of the audio system of FIG. 10.
Figure 12:
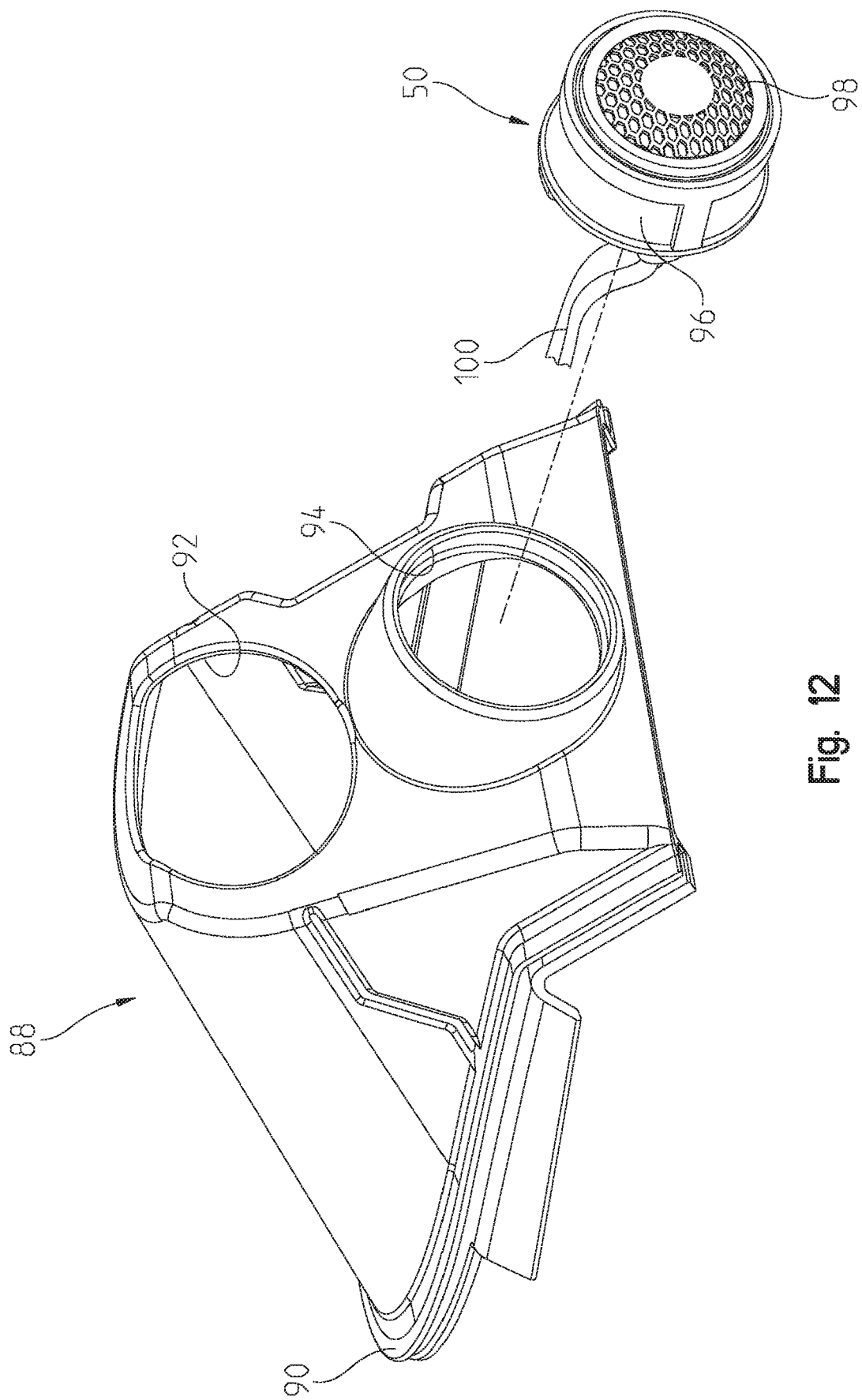
FIG. 12 is an exploded view of the enclosure and the speaker of FIG. 11.
Figure 13:
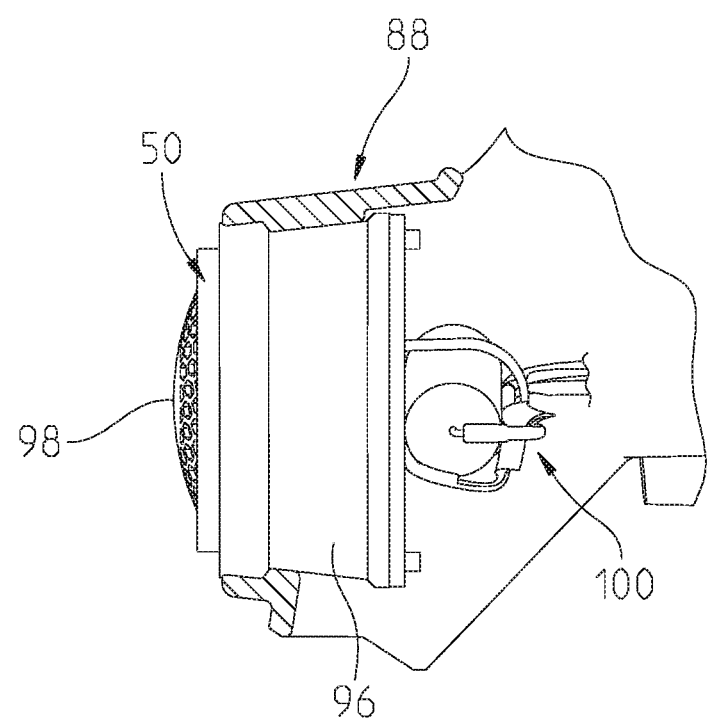
FIG. 13 is a cross-sectional view of the enclosure and the speaker of FIG. 11.
Figure 14:
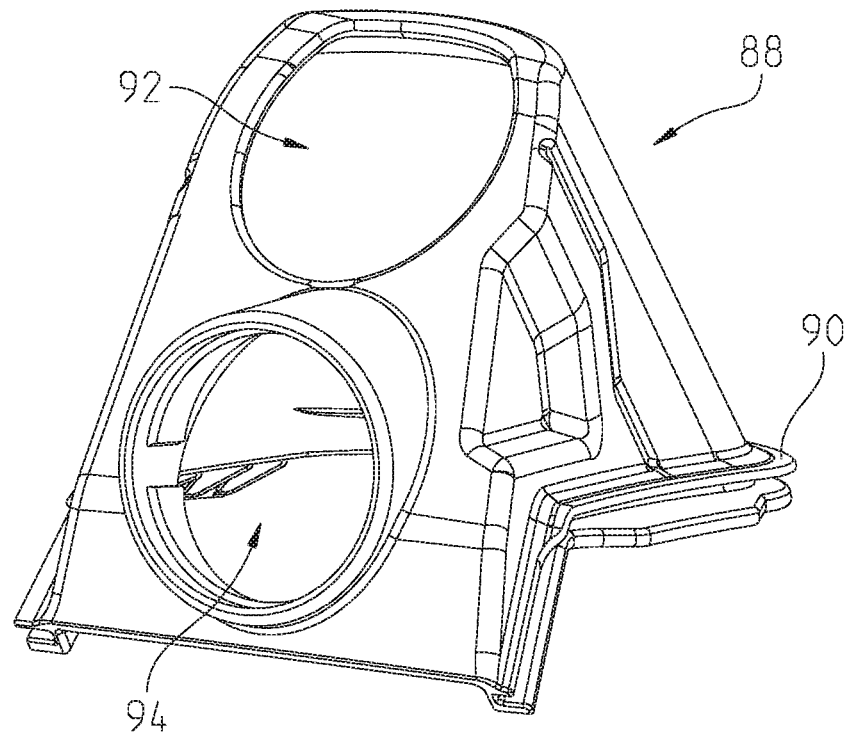
FIG. 14 is a rear right perspective view of the enclosure with the speaker removed.

Alternatively, as shown in FIG. 9, tweeters 50 also may be positioned along the length longitudinally-extending members 60 or may be positioned along or within the upper surface of dashboard assembly 78. If tweeters 50 are positioned along the length of longitudinally-extending members 60 and/or at the upper surface of dashboard assembly 78, tweeters 50 still face rearwardly (as shown in FIG. 10) towards operator area 20 to direct sound towards the operator's head/ears. It may be apparent that that various positions of tweeters 50 shown in FIG. 9 are positioned at or above the upper surface of dashboard assembly of an off-road vehicle and direct sound towards an operator's head for enhanced sound quality within the open-air operator area 20.

An enclosure 88 of vehicle body 18 is coupled to upper dash portion 80 and sealed thereto with a seal 90. Enclosure 88 is configured to conceal the connection of upper frame assembly 14 to lower frame assembly 12 at the lower end of forward portion 60a (shown as connection or coupling location 87 in FIG. 9). More particularly, upper frame assembly 14 is configured to couple (e.g., via welds or bolts) with lower frame assembly 12 at the lower ends of at least forward portion 60a and rearward portion 60c of longitudinally-extending members 60. This connection location or joint of forward portion 60a and lower frame assembly 12 is shown at 87 in at least FIG. 9. As such, a visible joint may be created at the lower ends of portions 60a, 60c which affect the aesthetics of vehicle 2.

Coupling location 87 between upper frame assembly 14 and lower frame assembly 12 at forward portion 60a also provides available space on vehicle 2 for additional speakers of audio system 40, such as tweeters 50. This location also allows tweeters 50 to face rearwardly and direct sound into operator area 20 without the sound being redirected by other panels or surfaces of vehicle 2. In this way, tweeters 50 positioned adjacent the lower end of forward portion 60a are spaced apart from lower, more enclosed areas of operator area 20 (such as a kick panel or a lower portion of door 76) which could negatively impact the direction and quality of the sound output by tweeters 50.

Referring still to FIGS. 9-14, enclosure 88 may be comprised as a rubber boot or enclosure. In some embodiments, enclosure 88 may be comprised of the same material and color as hood assembly 70 or front side panels 72 such that enclosure 88 aesthetically matches other portions of vehicle body 18. Alternatively, if the design of vehicle 2 dictates that enclosure 88 should be a different color and/or material than other portions of vehicle body 18 (e.g., the same material and/or color as longitudinally-extending member 60), such options are available because enclosure 88 is separable from hood assembly 70, front side panel 72, and dashboard assembly 78.

It may be appreciated that enclosure 88 is a single component of vehicle body 18 that is configured to support a portion of upper frame assembly 14 (e.g., forward portion 60a of longitudinally-extending members 60), support a portion of audio system 40 (e.g., front tweeter 50), seal with hood assembly 70, front side panel 72, and/or dashboard assembly 78 to prevent fluids or dirt and debris from entering vehicle 2 at that location, and conceal the joint or connection between forward portion 60a of longitudinally-extending member 60 and lower frame assembly 12 (i.e., coupling location 87). As shown best in FIGS. 11-14, enclosure 88 includes a first opening 92 configured to receive a portion of forward portion 60a. First opening 92 is positioned above a lower surface of enclosure 88 which allows the body of enclosure 88 to conceal the connection or joining of forward portion 60a to lower frame assembly such that forward portion 60a extends through opening 92 when joined with lower frame assembly 12.

Enclosure 88 also includes a second opening 94 (FIG. 14) configured to receive front tweeter 50. In one embodiment, second opening 94 is positioned below first opening 92 such that forward portion 60a extends over and above tweeter 50. This vertical alignment of openings 92, 94 also allows for a compact configuration of enclosure 88. When tweeter 50 is received within opening 94 and supported on enclosure 88, a speaker body 96 is concealed within enclosure 88 such that only a speaker mesh 98 is visible within operator area 20. Additionally, electrical components 100 of tweeter 50 (e.g., wiring) extend through opening 94 and also are concealed by enclosure 88. In this way, enclosure 88 allows for tweeters 50 to be positioned for enhanced sound quality within operator area 20 and also conceals the joining of forward portion 60a and lower frame assembly 12 in the same general location of tweeter 50.

Figure 3:
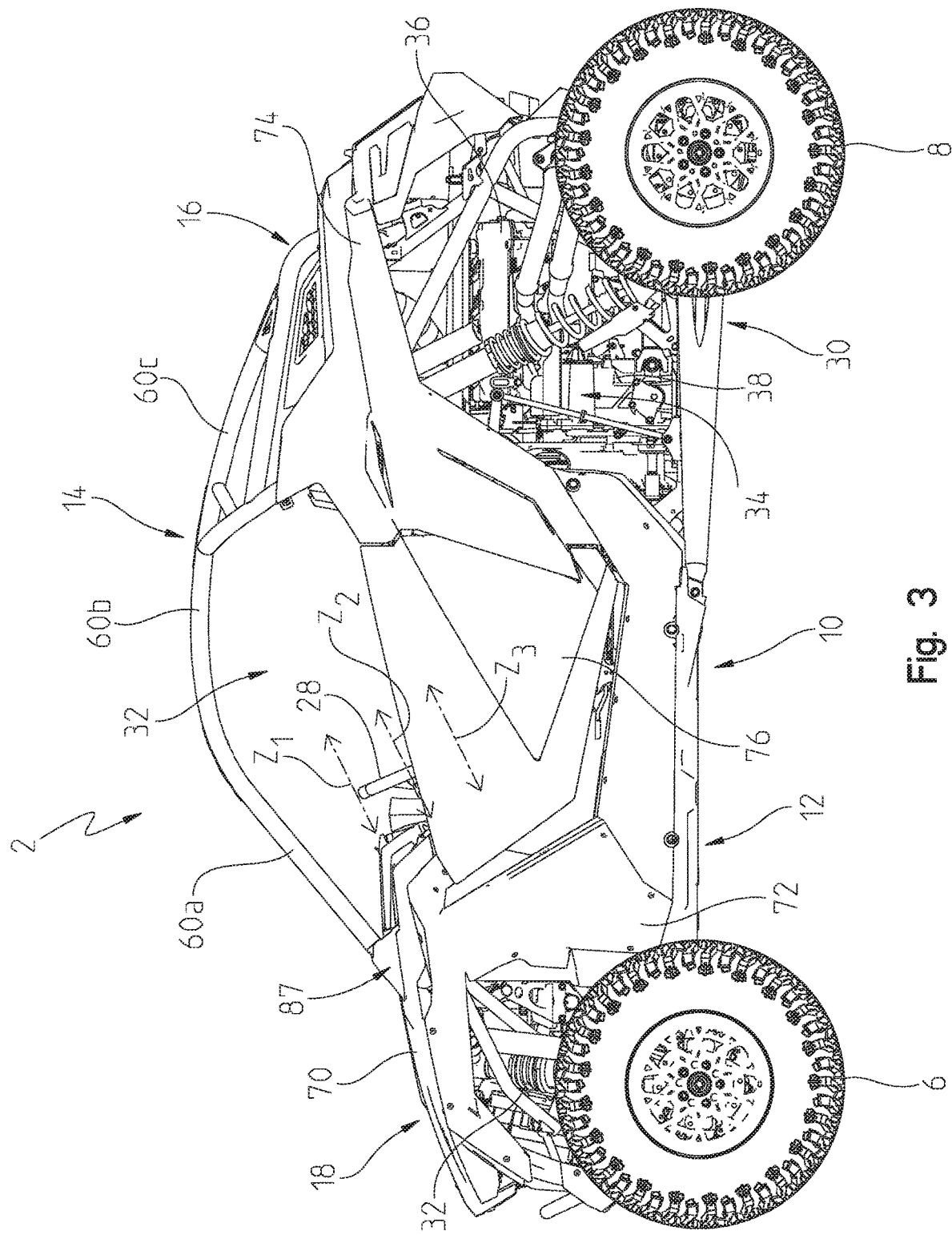
FIG. 3 is a left side view of the vehicle of FIG. 1.
Figure 4:
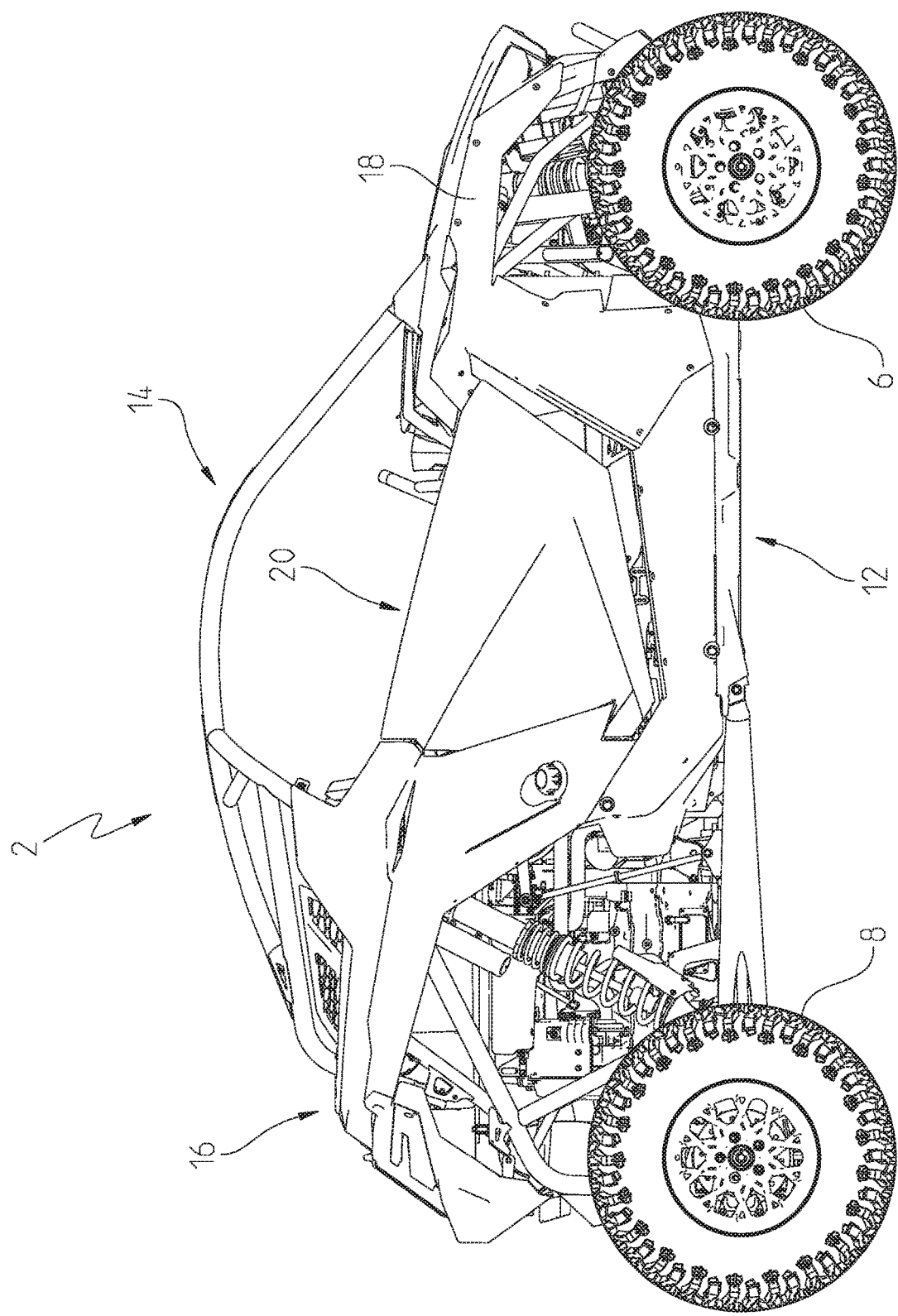
FIG. 4 is a right side view of the vehicle of FIG. 1.

Referring to FIGS. 3 and 10, because vehicle 2 may be an open-air vehicle, audio system 40 is configured to directly project sound towards the operator. In order to accomplish this, various speakers and components of audio system 40 are positioned to best direct sound towards the operator's head/ears. More particularly, if operator area 20 is divided into three sound zones (where zone 1 is labeled $Z_1$, zone 2 is labeled as $Z_2$ and positioned below zone 1, and zone 3 is labeled as $Z_3$ and positioned below zone 2) as shown in FIGS. 3 and 10, it is apparent that head rest 25 and, therefore, the operator's and passenger's heads are positioned in zone 1. Zone 2 may include the operator's shoulders and is positioned below head rest 25. Zone 3 may include the operator's mid-section or legs and is positioned along the mid-portion of seat back 24. Audio system 40 of the present disclosure is configured to direct sound within zone 1 such that sound is directed at the operator's head/ears. However, additional speakers or components of audio system 40 may also direct sound within zone 2. It may be apparent that zone 3 is away from the operator's head and, therefore, audio system 40 is not configured to direct sound therein. For example, rear speakers 42, 46 and front tweeters 50 may be configured and positioned to direct sound within zone 1 where the operator's head is positioned, thereby allowing multiple speakers to project sound directly towards the operator. Additionally, mid-bass speakers 52 may be configured to project sound within zone 2 for enhanced sound within operator area 20 because speakers 52 also are directly projecting sound towards the operator, rather than being positioned at a location where sound might be obstructed or redirected by other surfaces. As shown and disclosed herein, zones 1 and 2 are positioned above the floor and above at least half of the door in the vertical direction, and as such, audio system 40 is configured for sound to be directed towards the operator's head within at least zone 1.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:
    a frame assembly having an upper frame assembly and a lower frame assembly coupled to each other at a coupling location;
    a body assembly supported by the frame assembly and including a dashboard assembly;
    an open-air operator area positioned generally below an upper extent of the upper frame assembly and rearward of the coupling location; and
    an audio system configured to project sound within the operator area, the audio system including at least one speaker positioned above the dashboard assembly;
    wherein the body assembly includes an enclosure configured to receive and surround a perimeter of a portion of the upper frame assembly and to receive the at least one speaker.

2. The utility vehicle of claim 1, wherein the upper frame assembly includes a longitudinally-extending member having a forward portion, and a lower end of the forward portion is coupled to the lower frame assembly at the coupling location, and the at least one speaker is positioned adjacent the coupling location.

3. The utility vehicle of claim 2, wherein the at least one speaker is positioned rearward of the coupling location.

4. The utility vehicle of claim 1, wherein the enclosure is positioned at the coupling location.

5. The utility vehicle of claim 4, wherein the enclosure conceals the coupling location.

6. The utility vehicle of claim 1, wherein the enclosure includes a first opening through which the portion of the upper frame assembly extends and the enclosure includes a second opening configured to support the at least one speaker.

7. The utility vehicle of claim 6, wherein the second opening is positioned below the first opening.

8. The utility vehicle of claim 1, wherein the at least one speaker is positioned along a length of the upper frame assembly.

9. The utility vehicle of claim 8, wherein the at least one speaker is positioned at the coupling location.

10. A utility vehicle, comprising:
a frame assembly having an upper frame assembly and a lower frame assembly coupled to each other at a coupling location, the upper frame assembly including a first generally upstanding frame member, a second, generally upstanding frame member spaced apart from the first generally upstanding frame member, and a front laterally-extending frame member extending between the first and second generally upstanding frame members;
a plurality of panels at least partially defining exterior surfaces of the utility vehicle including at least a hood and a dashboard assembly and a door and supported by the frame assembly;
at least one seat supported by the frame assembly;
an open-air operator area positioned generally below an upper extent of the upper frame assembly and rearward of the coupling location, the at least one seat positioned within the open-air operator area; and
an audio system configured to project sound within the open-air operator area, the audio system including an enclosure and at least one speaker positioned above a portion of the door and being disposed outside of an envelope defined by an inner surface of the first generally upstanding member, an inner surface of the second generally upstanding frame member, an upper surface of the dashboard assembly, and a lower surface of the front laterally-extending frame member, the enclosure being operable to receive the at least one speaker and surround a perimeter of a portion of the first generally upstanding member.

11. The utility vehicle of claim 10, wherein the at least one speaker is positioned above a portion of the hood.

12. The utility vehicle of claim 10, wherein the at least one speaker is positioned above at least a portion of an upper surface of the door.

13. The utility vehicle of claim 10, further comprising seating positioned within the operator area, and the at least one speaker faces a rearward direction and directs sound towards a head rest of the seating.

14. The utility vehicle of claim 10, wherein the audio system is disposed generally within an envelope of the upper frame.

15. The utility vehicle of claim 10, wherein each of the first generally upstanding frame member and the second generally upstanding frame member of the upper frame assembly has a width, and the at least one speaker of the audio system includes a width substantially equal to the width of either of the first and second generally upstanding frame members.

16. The utility vehicle of claim 10, wherein the plurality of panels at least partially defining exterior surfaces of the utility vehicle further comprises a plurality of separate body panels.

17. The utility vehicle of claim 16, wherein at least one of the plurality of separate body panels extends to cover an open portion of the open-air operator area.

18. The utility vehicle of claim 17, wherein the least one of the plurality of separate body panels defines a door.

19. The utility vehicle of claim 10, wherein a laterally outer surface of the speaker is positioned laterally inward of a laterally outer surface of each of the first and second generally upstanding frame members.

20. A utility vehicle, comprising:
a frame assembly including a lower frame assembly and an upper frame assembly, and the upper frame assembly is coupled to the lower frame assembly at a first connection location;
a body assembly supported by the frame assembly and comprising a plurality of body panels;
an operator area defined by the upper and lower frame assemblies and including seating configured to support at least an operator of the utility vehicle; and
an audio system configured to project sound within the operator area, and at least one of the plurality of body panels is configured to support a portion of the audio system and a portion of the frame assembly, the at least one of the plurality of body panels positioned at least partially exterior of the operator area, and the at least one of the plurality of body panels is further configured to conceal the first connection location.

21. The utility vehicle of claim 20, wherein the first connection location is positioned generally forward of the operator area and positioned above at least a seat bottom supported within the operator area.

22. The utility vehicle of claim 20, wherein the at least one of the plurality of body panels includes an enclosure portion configured to conceal the first connection location, a first opening configured to receive a portion of the upper frame assembly, and a second opening configured to receive a speaker of the audio system.

23. The utility vehicle of claim 22, wherein the portion of the upper frame assembly is positioned above the speaker.

24. The utility vehicle of claim 22, wherein the body assembly further includes a dashboard assembly, and the speaker faces rearwardly and is positioned above the dashboard assembly.

25. The utility vehicle of claim 20, wherein the first connection location is defined by a portion of the lower frame assembly and a lower end of a longitudinally-extending member of the upper frame assembly, and the longitudinally-extending member is configured to extend upwardly from the lower frame assembly and over a portion of the seating.

26. A utility vehicle, comprising:
a frame assembly having an upper frame assembly and a lower frame assembly coupled to each other at a coupling location;
a plurality of panels supported by the frame assembly and including a dashboard assembly;
an open-air operator area positioned generally below an upper extent of the upper frame assembly and rearward of the coupling location; and
an audio system configured to project sound within the operator area, the audio system including at least one speaker positioned above the dashboard assembly;
wherein at least one of the plurality of panels is configured to conceal and surround a perimeter of a portion of the upper frame assembly and includes an enclosure configured to receive the at least one speaker.

27. The utility vehicle of claim 26, wherein the least one of the plurality of panels is configured to overlap a portion of the upper frame assembly.

28. The utility vehicle of claim 26, wherein the least one of the plurality of panels is configured to generally surround a portion of the upper frame assembly.

* * * * *